(12) United States Patent
Akiyama et al.

(10) Patent No.: US 12,489,938 B2
(45) Date of Patent: Dec. 2, 2025

(54) VIDEO TRANSMISSION APPARATUS, COMPUTER-READABLE STORAGE MEDIUM, VIDEO TRANSMISSION METHOD, AND SYSTEM

(71) Applicant: SoftBank Corp., Tokyo (JP)

(72) Inventors: Naohiro Akiyama, Tokyo (JP); Yoshihiro Endo, Tokyo (JP); Kazuhiko Sayama, Tokyo (JP); Junichiro Mamiya, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 18/516,976

(22) Filed: Nov. 22, 2023

(65) Prior Publication Data

US 2024/0089525 A1    Mar. 14, 2024

Related U.S. Application Data

(63) Continuation of application No. PCT/JP2022/046956, filed on Dec. 20, 2022.

(30) Foreign Application Priority Data

Dec. 24, 2021  (JP) .................................. 2021-211409

(51) Int. Cl.
*H04N 21/2743* (2011.01)
*H04N 21/2343* (2011.01)
(Continued)

(52) U.S. Cl.
CPC ..... *H04N 21/2743* (2013.01); *H04N 21/2343* (2013.01); *H04N 21/2662* (2013.01); *H04N 21/6181* (2013.01); *H04N 21/64738* (2013.01)

(58) Field of Classification Search
CPC ........... H04N 21/2743; H04N 21/2343; H04N 21/2662; H04N 21/6181; H04N 21/64738
(Continued)

(56) References Cited

U.S. PATENT DOCUMENTS 11,151,192 B1 *  10/2021  Campbell .............. G06V 20/58
11,343,551 B1 *   5/2022  Brailovskiy ..... H04N 21/23439
(Continued)

FOREIGN PATENT DOCUMENTS

JP   2005110244 A    4/2005
JP   2005303925 A   10/2005
(Continued)

OTHER PUBLICATIONS

International Search Report and Written Opinion (ISA/237) of the International Search Authority for International Patent Application No. PCT/JP2022/046956, mailed by the Japan Patent Office on Mar. 14, 2023.
(Continued)

*Primary Examiner* — Junior O Mendoza
*Assistant Examiner* — Alexander Boyd

(57) ABSTRACT

A video transmission apparatus, including: a video data obtaining unit which obtains video data; a video data storing unit which stores the video data obtained by the video data obtaining unit; a reduced video generating unit which generates reduced video of which a data volume is reduced by performing image processing on the video data obtained by the video data obtaining unit; a streaming transmitting unit which transmits the reduced video to a transmission destination by streaming; and a video data transmitting unit which transmits the video data stored in the video data storing unit to a preservation destination of the video data in response to a predetermined condition being satisfied, is provided.

20 Claims, 10 Drawing Sheets

(51) Int. Cl.
*H04N 21/2662* (2011.01)
*H04N 21/61* (2011.01)
*H04N 21/647* (2011.01)

(58) Field of Classification Search
USPC ............................................ 725/62
See application file for complete search history.

(56) References Cited

U.S. PATENT DOCUMENTS

| | | | |
|---|---|---|---|
| 11,765,324 B1 * | 9/2023 | Fu | ................. H04N 23/661 |
| | | | 348/143 |
| 11,792,455 B1 * | 10/2023 | Fu | .................... G06V 10/82 |
| | | | 315/297 |
| 2005/0071491 A1 | 3/2005 | Seo | |
| 2005/0281198 A1 * | 12/2005 | Miyamoto | ............ H04L 12/14 |
| | | | 370/252 |
| 2012/0307078 A1 * | 12/2012 | Canan | ............ H04N 21/44245 |
| | | | 709/217 |
| 2014/0187239 A1 * | 7/2014 | Friend | ................. H04L 65/40 |
| | | | 455/426.1 |
| 2015/0089558 A1 | 3/2015 | Shimizu | |
| 2020/0120519 A1 * | 4/2020 | Horton | ................. H04L 41/147 |
| 2020/0169894 A1 * | 5/2020 | Dillon | ................... H04W 16/18 |
| 2022/0021717 A1 * | 1/2022 | Schrantz | .............. G06F 3/0481 |

FOREIGN PATENT DOCUMENTS

| | | |
|---|---|---|
| JP | 2007013735 A | 1/2007 |
| JP | 2012019407 A | 1/2012 |
| JP | 2013211784 A | 10/2013 |

OTHER PUBLICATIONS

Office Action issued for counterpart Japanese Application No. 2021-211409, transmitted from the Japanese Patent Office on Mar. 14, 2023 (drafted on Mar. 7, 2023).

* cited by examiner

600

| HISTORY NUM-BERS (602) | DATES AND TIMES | | LINE SPEEDS (610) |
| --- | --- | --- | --- |
| | YEARS, MONTHS, AND DATES (604, 606) | TIMES (608) | |
| 1 | 2021/11/11 | 3:00 | 200Mbps |
| 2 | 2021/11/11 | 4:00 | 180Mbps |
| 3 | 2021/11/11 | 5:00 | 150Mbps |
| 4 | 2021/11/11 | 6:00 | 100Mbps |
| 5 | 2021/11/11 | 7:00 | 80Mbps |
| ⋮ | ⋮ | ⋮ | ⋮ |

FIG.8

VIDEO TRANSMISSION APPARATUS, COMPUTER-READABLE STORAGE MEDIUM, VIDEO TRANSMISSION METHOD, AND SYSTEM

The contents of the following patent application(s) are incorporated herein by reference:
NO. 2021-211409 filed in JP on Dec. 24, 2021
NO. PCT/JP2022/046956 filed in WO on Dec. 20, 2022

BACKGROUND

1. Technical Field

The present invention relates to a video transmission apparatus, a computer-readable storage medium, a video transmission method, and a system.

2. Related Art

Patent Document 1 describes about a technique for providing a stream data transmission apparatus that enables later viewing of original contents in high quality if a transmission bandwidth of a communication line used cannot be secured.

PRIOR ART DOCUMENT

Patent Document

Patent Document 1: Japanese Patent Application Publication No. 2005-303925

BRIEF DESCRIPTION OF THE DRAWINGS

FIG. 8 schematically illustrates one example of a history data table 600.

DESCRIPTION OF EXEMPLARY EMBODIMENTS

There is known a technique that allows a camera equipped with a communication module which supports mobile communication to transmit captured video data through a network, so that the video received is displayed and/or stored at a received destination. Because video data is large in volume, if many pieces of video data are transmitted, a network is congested and thus such a problem as badly affecting other users' communications may be caused. Meanwhile, a video transmission apparatus according to the present embodiment temporarily stores captured video data, and changes a transmission timing of the video data depending on three major factors, for example. Firstly, a time at which the video data is transmitted is preset to a time at which a bandwidth of the network is predicted to be free. Secondly, a traffic condition is confirmed by means of a network speed test function, and then the video data is transmitted at a timing at which a bandwidth of the network is free. Thirdly, a network traffic condition is automatically determined by artificial intelligence (AI), and then the video data is transmitted at a time at which a bandwidth of the network is determined as being free.

Hereinafter, the present invention will be described through embodiments of the invention, but the following embodiments do not limit the invention according to claims. In addition, not all of the combinations of features described in the embodiments are essential to the solution of the invention.

Figure 1:
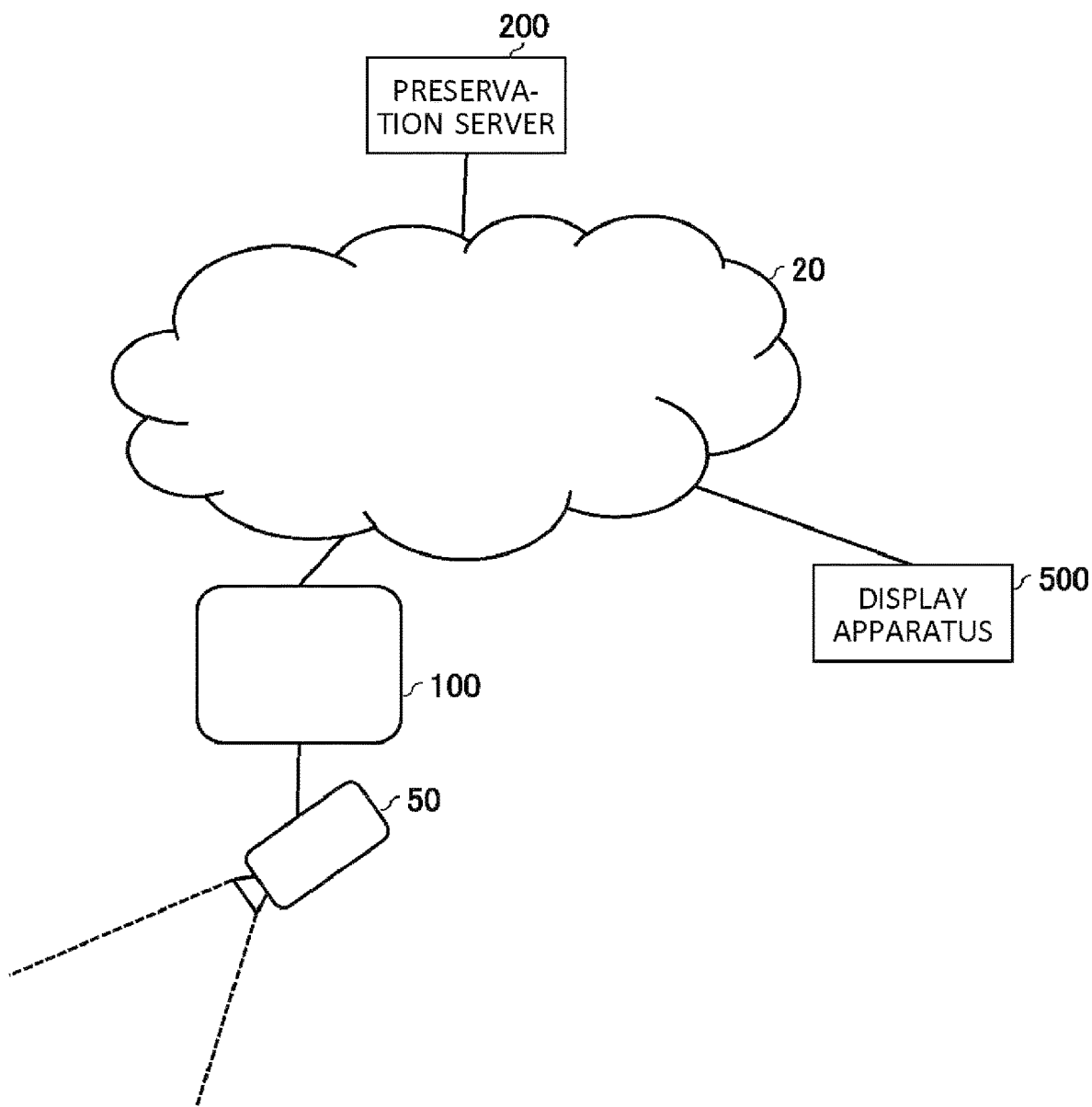
FIG. 1 schematically illustrates one example of a system 10.

FIG. 1 schematically illustrates one example of a system 10. The system 10 includes a video transmission apparatus 100 and a preservation server 200 which are connected to each other through a network 20. The system 10 may include a display apparatus 500.

The system 10 operates such that video data obtained and temporarily stored by the video transmission apparatus 100 is transmitted to and stored in the preservation server 200 that is a preservation destination, through the network 20. Also, the system 10 operates such that video data obtained and processed with volume reduction processing by the video transmission apparatus 100 is transmitted to and displayed by the display apparatus 500 that is a transmission destination, through the network 20.

The network 20 may be a mobile communication network. The mobile communication network may conform to any of the 3rd Generation (3G) communication system, the Long Term Evolution (LTE) communication system, the 5th Generation (5G) communication system, the 6th Generation (6G) communication system, and the communication system of the subsequent generation of the 6G communication system. The network 20 can also be a local area network (LAN). The network 20 can also be the Internet. The network 20 can include more than one of, or all of the mobile communication network, LAN, and the Internet.

For example, the video transmission apparatus 100 obtains video data from a camera 50 connected to the video transmission apparatus 100. The video transmission apparatus 100 can also obtain video data 105 by means of a built-in camera of the video transmission apparatus 100. The camera 50 may be a monitoring camera, or any other camera. The video transmission apparatus 100 may obtain video data from any device. For example, the video transmission apparatus 100 obtains video data generated by a device that can generate the video data, from the device.

The video transmission apparatus 100 may control a data volume of video data to be transmitted, according to a purpose/application of the video data. For example, the video transmission apparatus 100 temporarily stores obtained video data, performs image processing on the video data in order to reduce its data volume and transmits the reduced video to the display apparatus 500 by streaming through the network 20, and transmits the video data to the preservation server 200 through the network 20 in response to a predetermined condition being satisfied. The reduced video may be video etc. for streaming of which a data volume is reduced and thereby having excellent transmittability.

The preservation server 200 may be a server which is for storing video data, and located in the cloud. The preservation server 200 may be located in multi-access edge computing (MEC).

The display apparatus 500 may be any apparatus which displays video. The display apparatus 500 may be a smartphone, a tablet terminal, a personal computer (PC), or the like. For example, the display apparatus 500 receives reduced video received from the video transmission apparatus 100 by streaming and displays the reduced video. For example, the display apparatus 500 displays video data received from the preservation server 200.

Examples of image processing performed by the video transmission apparatus 100 for generating the reduced video include image quality reduction, frame rate reduction, trimming, and the like. For example, the video transmission apparatus 100 generates the reduced video by reducing image quality of the video data. The video transmission apparatus 100 may also generate the reduced video by reducing a frame rate of the video data. The video transmission apparatus 100 may also generate the reduced video by trimming the video data. For example, the video transmission apparatus 100 trims the video data by cutting off only a specified area of the video data. The video transmission apparatus 100 may generate the reduced video from the video data by performing a combination of the image quality reduction, frame rate reduction, and trimming. For example, the reduced video is used by the display apparatus 500 for confirming real-time video.

In response to a predetermined condition being satisfied, the video transmission apparatus 100 may transmit the video data having an original data volume to the preservation server 200. The video transmission apparatus 100 may also compress and transmit the video data as high-quality video to the preservation server 200. The preservation server 200 stores the received video data, and transmits the video data to the display apparatus 500 in response to a request from the display apparatus 500, for example. For example, the video data is used by the display apparatus 500 for confirming video taken in the past.

For example, the video transmission apparatus 100 transmits the video data to the preservation server 200 at a preset time. The preset time may be set for a time late at night on a weekday etc., when a bandwidth of the network 20 is relatively free. In addition, the video transmission apparatus 100 transmits the video data to the preservation server 200 in a preset timeframe, for example. For example, the preset timeframe may be set for a timeframe late at night of a weekday etc., when the bandwidth of the network 20 is relatively free. In this manner, the reduced video is transmitted to the display apparatus 500 at real-time, whereas the video data can be transmitted to the preservation server 200 when there is high possibility in the network 20 to be free, and thereby network loads can be appropriately reduced.

For example, the video transmission apparatus 100 executes speed measurement on the network 20 and performs this speed measurement periodically or irregularly, and if a line speed obtained as a result of the measurement is equal to or more than a predetermined communication threshold value, then the video transmission apparatus 100 may transmit the video data 105 to the preservation server 200. The video transmission apparatus 100 may measure a line speed of a communication line to the preservation server 200 through the network 20. If the network 20 is the mobile communication network, the video transmission apparatus 100 may measure a line speed of a communication line to a wireless base station that the video transmission apparatus 100 is camping on. In this manner, the reduced video is transmitted to the display apparatus 500 at real-time, whereas the video data can be transmitted to the preservation server 200 when the network 20 is free, and thereby network loads can be appropriately reduced.

The video transmission apparatus 100 may execute a speed measurement on the network 20 at a timing of transmission to the display apparatus 500, and if a line speed obtained as a result of the measurement is equal to or more than a predetermined threshold value, then the video transmission apparatus 100 may transmit the video data to the display apparatus 500 instead of the reduced video.

The video transmission apparatus 100 may predict a timing at which the bandwidth of the network 20 is free by using machine learning, and transmit video data to the preservation server 200 at the predicted timing. For example, the video transmission apparatus 100 predicts traffic on the network 20 by learning speed measurement results for the network 20 or data representing transmission dates and times.

Line speeds, dates and times of the speed measurements, and the like obtained by periodic speed measurements on the network 20 may be used as trained data for the machine learning.

The video transmission apparatus 100 may transmit video data to the preservation server 200 according to an instruction from the preservation server 200. For example, the video transmission apparatus 100 starts transmission of the video data to the preservation server 200 at a time specified by the preservation server 200. For example, the video transmission apparatus 100 transmits the video data to the preservation server 200 in a timeframe specified by the preservation server 200.

For example, the preservation server 200 receives history data containing the line speed of the communication line between the video transmission apparatus 100 and the preservation server 200 measured by the video transmission apparatus 100, and a date and time at which the measurement is executed, from the video transmission apparatus 100, and generates a machine learning model to which a date and time is input and which outputs a line speed, through machine learning by using multiple pieces of history data. Then, the preservation server 200 decides contents of instruction for the video transmission apparatus 100 by using the machine learning model. For example, the preservation server 200 identifies a period in which a bandwidth of the network 20 is free by using the machine learning model, and instructs the video transmission apparatus 100 on a time in the period or timeframe in the period.

Figure 2:
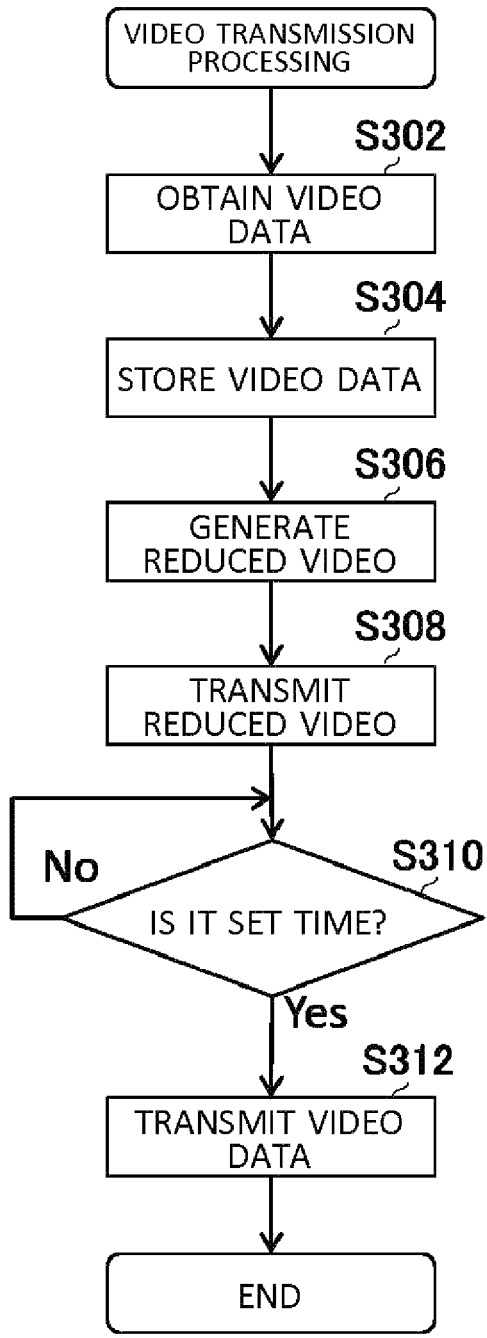
FIG. 2 schematically illustrates one example of a flow of video transmission processing performed by a video transmission apparatus 100.

FIG. 2 schematically illustrates one example of a flow of video transmission processing performed by the video transmission apparatus 100. Here, a starting state is when the camera 50 starts capturing video.

In step (step may be abbreviated as S) 302, the video transmission apparatus 100 obtains video data from the camera 50. In S304, the video transmission apparatus 100 stores the video data obtained in S302. The video transmission apparatus 100 may store the video data that is obtained from the camera 50 and having an original volume as it is, or high-quality video that is obtained by compressing the video data.

In S306, the video transmission apparatus 100 generates reduced video by performing image processing on the video data obtained in S302. In S308, the video transmission apparatus 100 starts transmission of the reduced video generated in S306 to the display apparatus 500 by streaming through the network 20. The video transmission apparatus 100 may continue the transmission by streaming until the transmission of the reduced video is completed.

In S310, the video transmission apparatus 100 determines whether it is a preset time, and if it is the set time, then the flow proceeds to S312, and if it is not the set time, then S310 is repeated. Being the set time refers to such a case in which when the preset time is 3:00 AM and a current time is 3:00 AM.

In S312, the video transmission apparatus 100 transmits the video data stored in S304 to the preservation server 200. The video transmission apparatus 100 ends the video transmission processing in response to the transmission of the reduced video to the display apparatus 500, and the transmission of the video data to the preservation server 200 being completed.

Figure 3:
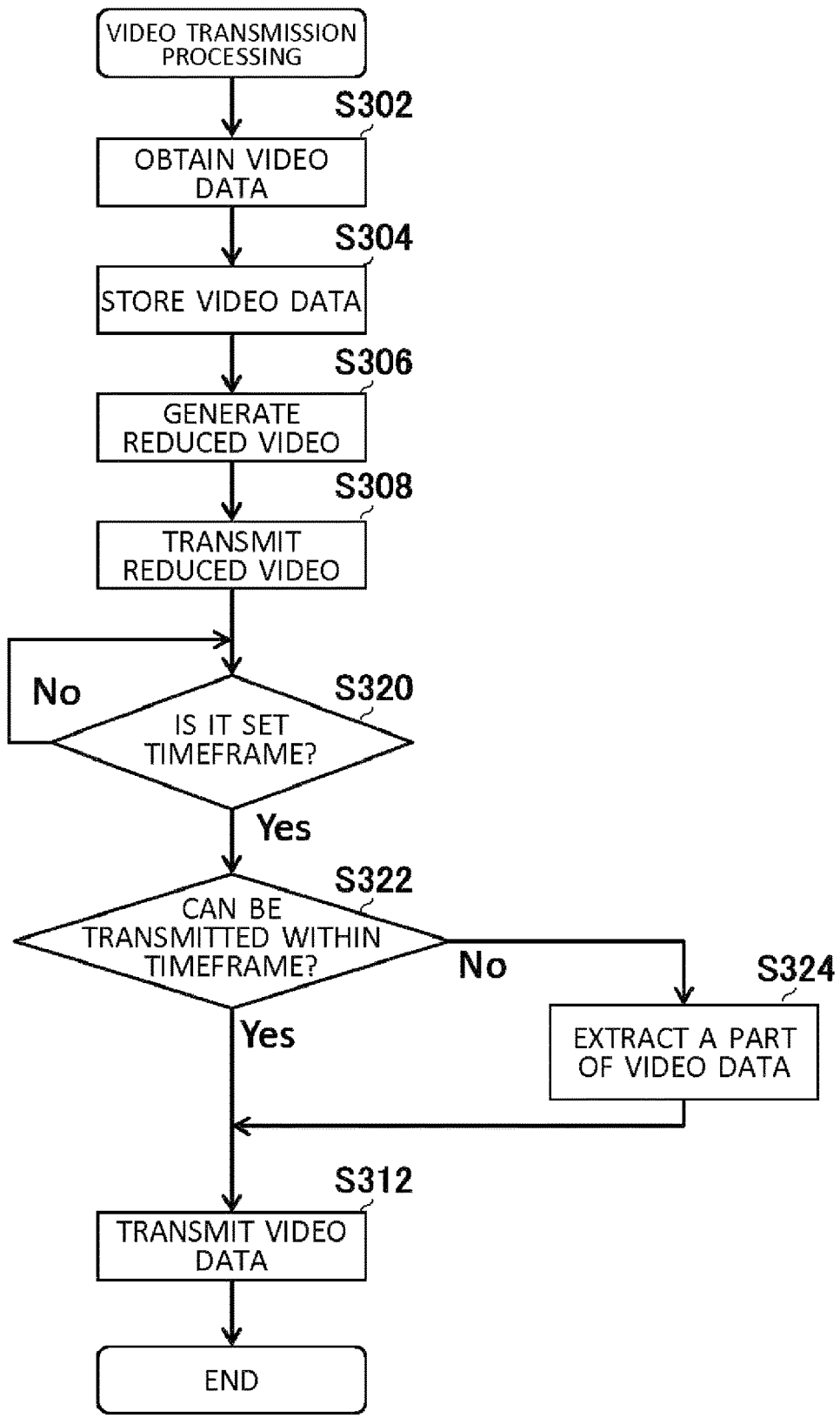
FIG. 3 schematically illustrates another example of the flow of video transmission processing performed by the video transmission apparatus 100.

FIG. 3 schematically illustrates another example of the flow of video transmission processing performed by the video transmission apparatus 100. Because this flow is the same as that of FIG. 2 till the transmission of the reduced video in S308, steps from S320 onward will be mainly described below.

In S320, the video transmission apparatus 100 determines whether it is in a preset timeframe, and if it is in the set timeframe, then the flow proceeds to S322, and if it is not in the set timeframe, then S320 is repeated. Being in the set timeframe refers to such a case in which when the preset timeframe is from 3:00 AM to 4:00 AM and a current time is between 3:00 AM and 4:00 AM, for example, 3:00 AM.

In S322, the video transmission apparatus 100 determines whether the video data stored in S304 can be transmitted to the preservation server 200 within the preset timeframe, and if it can be transmitted within the set timeframe, then the flow proceeds to S312, and if it cannot be transmitted within the set timeframe, then the flow proceeds to S324. Being able to transmit within the set timeframe may mean that, if the preset timeframe is from 3:00 AM to 4:00 AM, a time required for transmission is within one hour from 3:00 AM to 4:00 AM that is the set timeframe, when the time required is calculated by dividing a data volume of the video data that is scheduled to be transmitted, by a line speed of a current network 20.

In S324, the video transmission apparatus 100 extracts a part of the video data stored in S304. The part of the video data may be an important part of the video data. For example, in a baseball game broadcast, the important part is final minutes of an offensive or defensive play, or a scoring scene. The important part of the video data may be pre-specified by a person. Alternatively, the video transmission apparatus 100 may extract the important part from the video data by using an existing technique.

In S312, the video transmission apparatus 100 starts transmission of the video data stored in S304 or the video data extracted in S324 to the preservation server 200. The video transmission apparatus 100 ends the video transmission processing in response to the transmission of the reduced video to the display apparatus 500, and the transmission of the video data to the preservation server 200 being completed.

Figure 4:
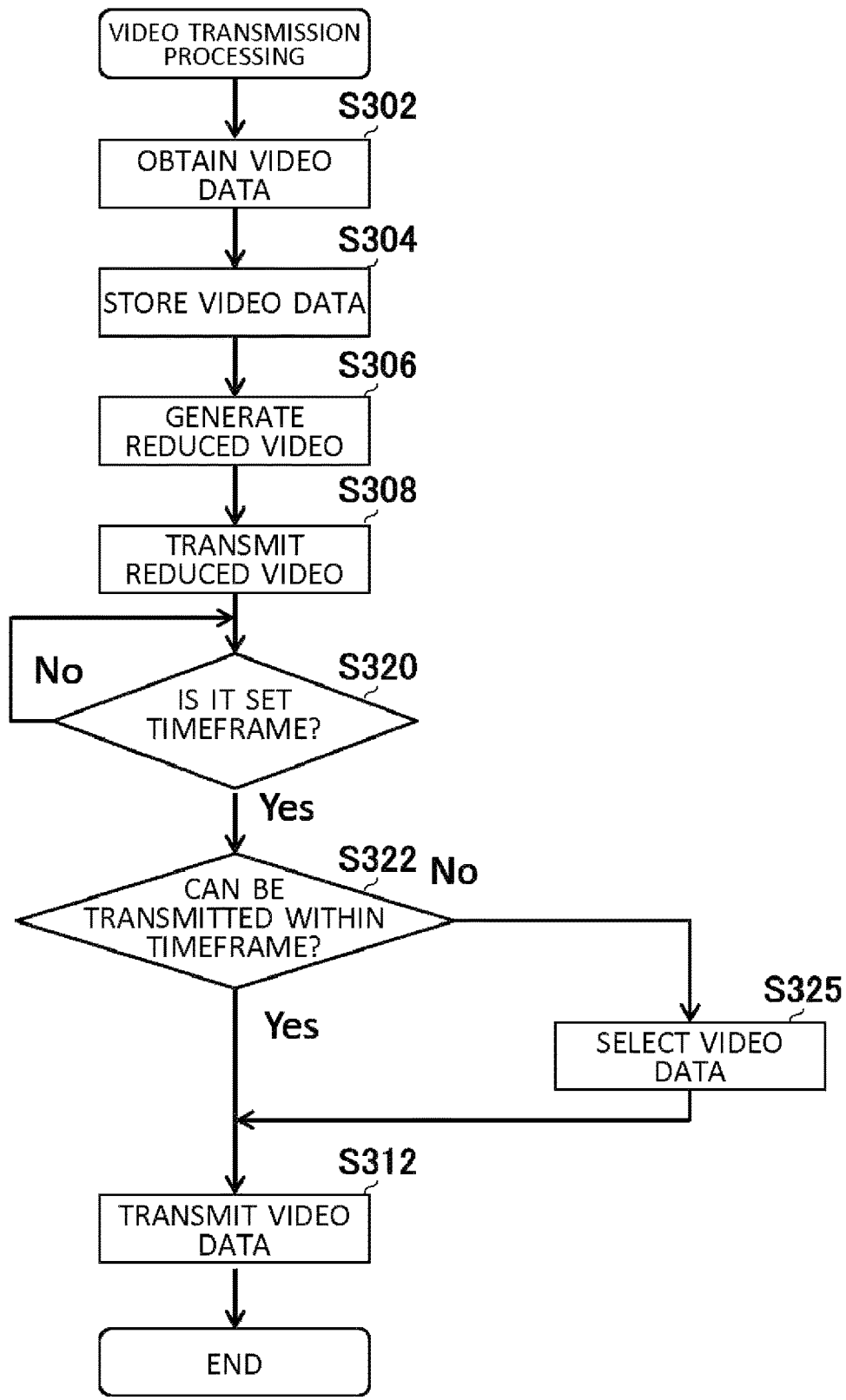
FIG. 4 schematically illustrates yet another example of the flow of video transmission processing performed by the video transmission apparatus 100.

FIG. 4 schematically illustrates yet another example of the flow of video transmission processing performed by the video transmission apparatus 100. Because this flow is the same as that of FIG. 3 till S320, steps from S322 onward will be mainly described below. Note that, a case will be described here in which the video transmission apparatus 100 has obtained multiple pieces of video data in S302, and the multiple pieces of video data have been stored in S304.

In S322, the video transmission apparatus 100 determines whether the multiple pieces of video data stored in S304 can be transmitted to the preservation server 200 within a preset timeframe, and if it can be transmitted within the set timeframe, then the flow proceeds to S312, and if it cannot be transmitted within the set timeframe, then the flow proceeds to S325.

In S325, the video transmission apparatus 100 selects video data with a data volume that can be transmitted within the set timeframe among the multiple pieces of video data stored in S304. The video transmission apparatus 100 can select multiple pieces of video data as long as they can be transmitted. The video transmission apparatus 100 may select video data with higher priority among the multiple pieces of video data. Priorities of the multiple pieces of video data may be pre-specified by a person. Alternatively, the older a time at which video data was obtained is, the higher priority the video data may be assigned with. Alternatively, the video transmission apparatus 100 may decide priorities of the multiple pieces of video data by using an existing technique.

In S312, the video transmission apparatus 100 starts transmission of the multiple pieces of video data stored in S304 or the video data selected in S325 to the preservation server 200. The video transmission apparatus 100 ends the video transmission processing in response to the transmission of the reduced video to the display apparatus 500, and the transmission of the video data to the preservation server 200 being completed.

Figure 5:
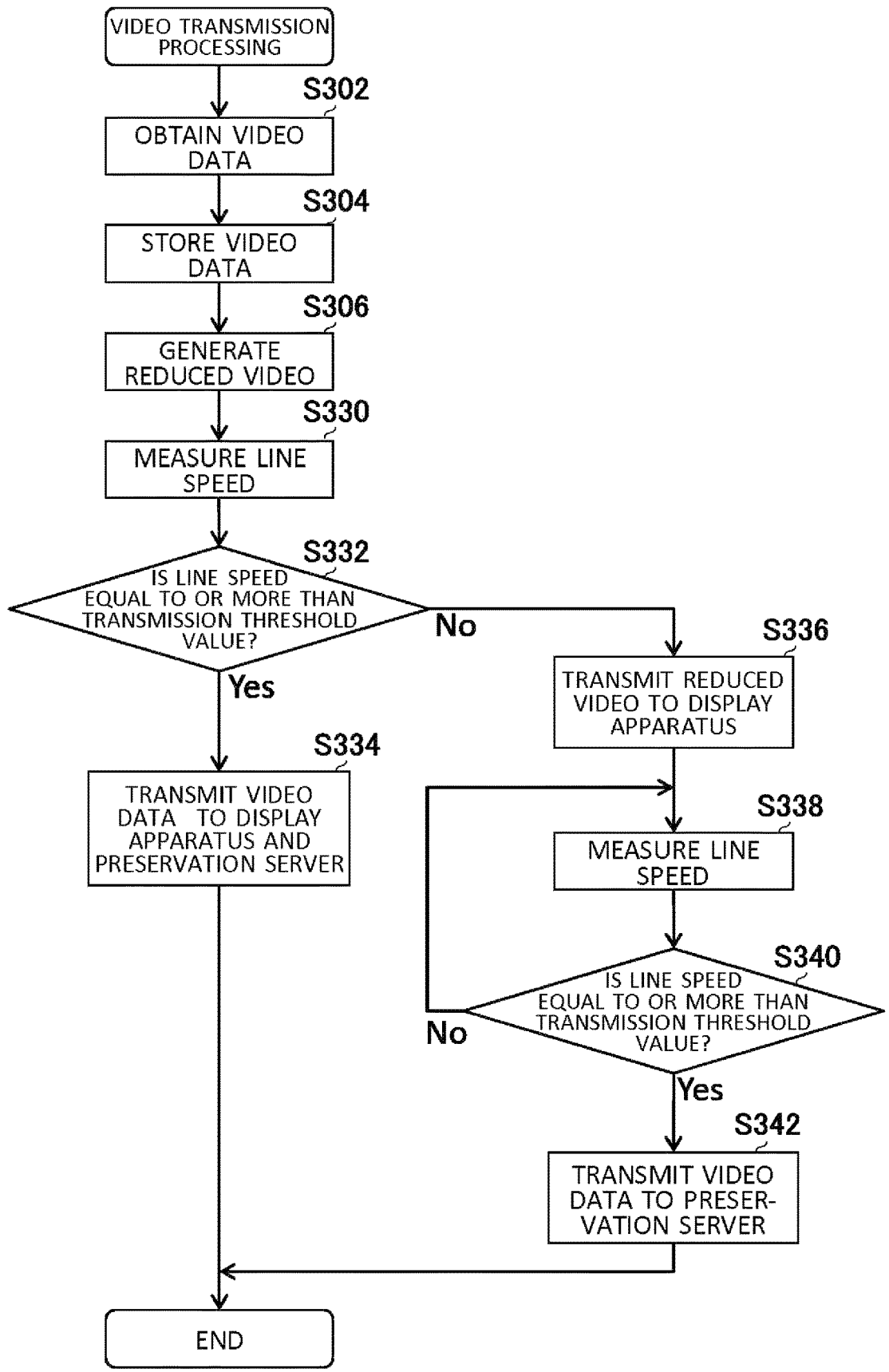
FIG. 5 schematically illustrates yet another example of the flow of video transmission processing performed by the video transmission apparatus 100.

FIG. 5 schematically illustrates yet another example of the flow of video transmission processing performed by the video transmission apparatus 100. Because this flow is the same as that of FIG. 2 till S306, steps from S330 onward will be mainly described below.

In S330, the video transmission apparatus 100 measures a line speed of the network 20. In S332, the video transmission apparatus 100 determines whether the line speed measured in S330 is equal to or more than a preset transmission threshold value, and if it is equal to or more than the preset transmission threshold value, then the flow proceeds to S334, and if it is not equal to or more than the preset transmission threshold value, then the flow proceeds to S336. Being equal to or more than the preset transmission threshold value may be such a case in which, when the line speed measured in S330 is 100 Mbps, the preset transmission threshold value is 10 Mbps.

In S334, the video transmission apparatus 100 starts transmission of the video data stored in S304 to the display apparatus 500 and the preservation server 200 through the network 20. In S336, the video transmission apparatus 100 starts transmission of the reduced video generated in S306 to the display apparatus 500 through the network 20.

In S338, the video transmission apparatus 100 measures a line speed of the network 20. In S340, the video transmission apparatus 100 determines whether the line speed measured in S338 is equal to or more than a preset transmission threshold value, and if it is equal to or more than the preset transmission threshold value, then the flow proceeds to S342, and if it is not equal to or more than the preset transmission threshold value, then the flow returns to S338. In S342, the video transmission apparatus 100 starts transmission of the video data stored in S304 to the preservation server 200 through the network 20. The video transmission apparatus 100 ends the video transmission processing in response to the transmission being completed.

Note that, in S334, the video transmission apparatus 100 may transmit the video data only to the display apparatus 500.

With regard to S330 onward, the video transmission apparatus 100 may firstly measure a line speed of a communication line to the display apparatus 500, and if the line speed is equal to or more than the threshold value, then the video transmission apparatus 100 may transmit the video data to the display apparatus 500, and if the line speed is not equal to or more than the threshold value, then the video transmission apparatus 100 may transmit the reduced video to the display apparatus 500. In this case, the video data may not need to be transmitted to the preservation server 200, but the video transmission apparatus 100 can still measure a line speed of the communication line to the preservation server 200, and if the line speed is equal to or more than the threshold value, then the video transmission apparatus 100 can transmit the video data to the preservation server 200.

Figure 6:
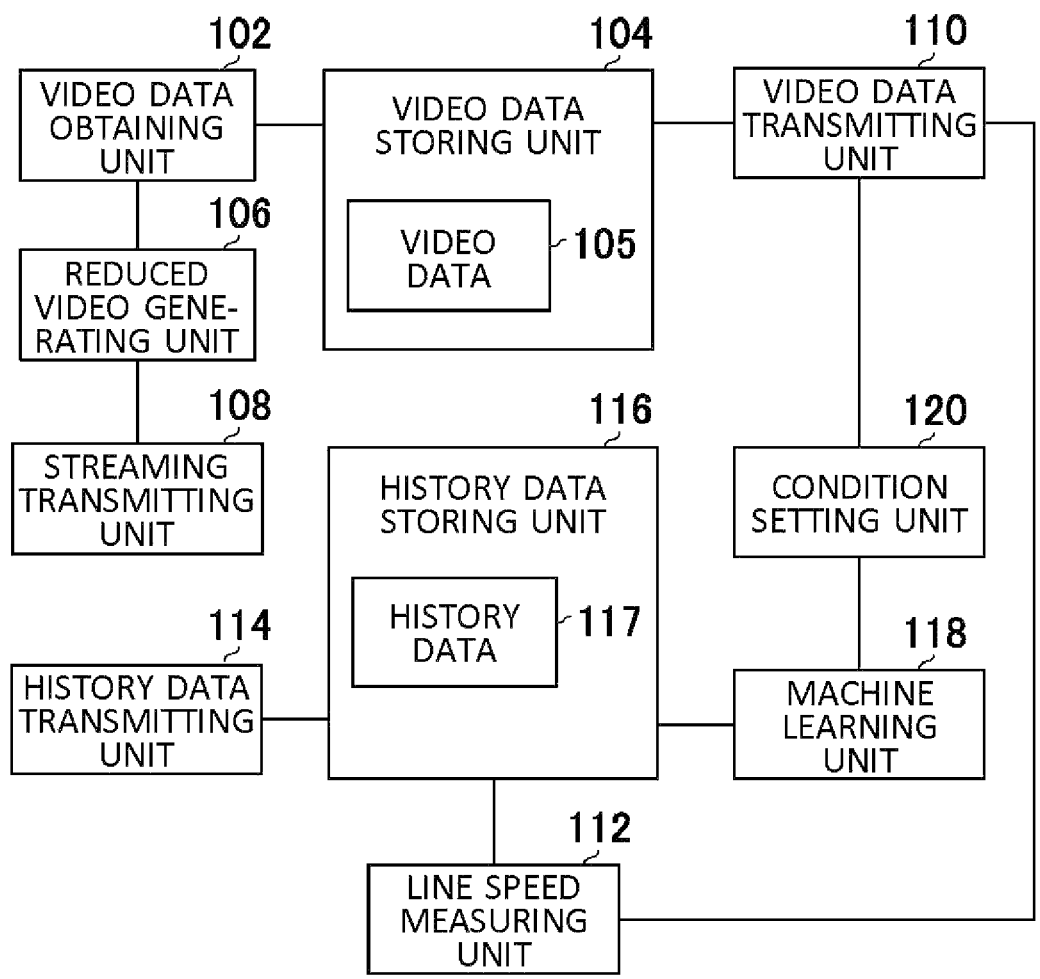
FIG. 6 schematically illustrates one example of functional structure of the video transmission apparatus 100.

FIG. 6 schematically illustrates one example of functional structure of the video transmission apparatus 100. The video transmission apparatus 100 includes a video data obtaining unit 102, a video data storing unit 104, a reduced video generating unit 106, a streaming transmitting unit 108, a video data transmitting unit 110, a line speed measuring unit 112, a history data transmitting unit 114, a history data storing unit 116, a machine learning unit 118, and a condition setting unit 120. Note that, it is not essential for the video transmission apparatus 100 to include all of these above.

The video data obtaining unit 102 obtains video data. The video data obtaining unit 102 may receive video data captured by the camera 50, from the camera 50. The video data obtaining unit 102 may obtain video data captured by a built-in camera of the video transmission apparatus 100. The video data obtaining unit 102 may also receive video data from another device.

The video data storing unit 104 stores video data 105 obtained by the video data obtaining unit 102. The video data storing unit 104 may store original video data 105 obtained by the video data obtaining unit 102. The video data storing unit 104 may also compress the video data 105 obtained by the video data obtaining unit 102 into high-quality video, and store the high-quality video.

The reduced video generating unit 106 generates reduced video of which a data volume is reduced by performing image processing on the video data 105 obtained by the video data obtaining unit 102. The reduced video generating unit 106 may execute at least any of image quality reduction on the video data 105, frame rate reduction on the video data 105, or trimming on the video data 105 in order to reduce a data volume of the video data 105 and thereby generate the reduced video. The reduced video generating unit 106 may execute preset image processing among the image quality reduction, frame rate reduction, and trimming. The reduced video generating unit 106 may execute image processing that is selected depending on a line speed, among the image quality reduction, frame rate reduction, and trimming. The reduced video generating unit 106 may execute image processing that is selected depending on contents of the video data, among the image quality reduction, frame rate reduction, and trimming.

The streaming transmitting unit 108 transmits the reduced video generated by the reduced video generating unit 106 to a transmission destination by streaming. The streaming transmitting unit 108 may transmit the reduced video by any transmission method as long as the reduced video can be displayed at the transmission destination at real-time. For example, the transmission destination is the display apparatus 500.

The video data transmitting unit 110 transmits the video data 105 stored in the video data storing unit 104 to a preservation destination of the video data 105, in response to a predetermined condition being satisfied. For example, the preservation destination is the preservation server 200.

The video data transmitting unit 110 may start transmission of the video data 105 to the preservation destination at a preset time.

The video data transmitting unit 110 may transmit the video data 105 to the preservation destination in a preset timeframe. The video data transmitting unit 110 may determine whether the transmission of the video data 105 will be completed within the preset timeframe, and if it is determined that it will, then the video data transmitting unit 110 may transmit the video data 105 to the preservation destination, and if it is determined that it will not, then the video data transmitting unit 110 may transmit a part of the video data 105 extracted from the video data 105 according to a predetermined condition, in the preset timeframe. For example, the video data transmitting unit 110 extracts highly important part of the video data 105. The highly important part of the video data may be pre-specified by a person. Alternatively, the video data transmitting unit 110 may extract an important part from the video data by using an existing technique.

When multiple pieces of video data 105 are stored in the video data storing unit 104, the video data transmitting unit 110 may determine whether transmission of the multiple pieces of video data 105 will be completed within a preset timeframe, and if it is determined that it will, then the video data transmitting unit 110 may transmit the multiple pieces of video data 105 to the preservation destination, and if it is determined that it will not, then the video data transmitting unit 110 may transmit at least any piece of the multiple pieces of video data 105 according to priorities of the multiple pieces of video data 105. For example, the video data transmitting unit 110 preferentially transmits a piece of video data, among the multiple pieces of the video data 105, obtained by the video data obtaining unit 102 at an obtainment time earlier than those of a rest of the multiple pieces of the video data 105. The video data transmitting unit 110 may select and transmit video data 105 that has higher priority among the multiple pieces of video data 105. Priorities of the multiple pieces of video data 105 may be pre-specified by a person. Alternatively, the video data transmitting unit 110 may decide priorities of the multiple pieces of video data 105 by using an existing technique.

The line speed measuring unit 112 measures a line speed of the network 20. The line speed measuring unit 112 may measure a line speed of a communication line to the preservation destination through the network 20. The line speed measuring unit 112 may measure a line speed of a communication line to the transmission destination through the network 20. If the video transmission apparatus 100 is camping on a wireless base station, the line speed measuring unit 112 may measure a line speed of a communication line to the wireless base station.

If the line speed measured by the line speed measuring unit 112 is equal to or more than a predetermined transmission threshold value, the video data transmitting unit 110 may transmit the video data 105 to the preservation destination. If the line speed of the communication line to the transmission destination measured by the line speed measuring unit 112 at a timing at which the streaming transmitting unit 108 transmits the reduced video to the transmission destination is equal to or more than the predetermined transmission threshold value, the video data transmitting unit 110 may transmit the video data 105 to the transmission destination instead of the streaming transmitting unit 108 performing the transmission to the transmission destination by streaming. If the line speed measured by the line speed measuring unit 112 is equal to or more than an alternate threshold value that shows a value faster than the transmission threshold value, the video data transmitting unit 110 may transmit the video data 105 to the transmission destination instead of the streaming transmitting unit 108 transmitting to the transmission destination by streaming. In this manner, when a network line has ample available capacity, the video data can be transmitted to the display apparatus 500 instead of the reduced video, and thus high-quality video can be displayed by the display apparatus 500. The alternate threshold value may be any value as long as it shows a value faster than the transmission threshold value, for example, the alternate threshold value may be a value showing that the network line has ample available capacity for a use in such a situation as above.

The video data transmitting unit 110 may transmit the video data 105 to a storage destination located in the cloud through a mobile communication line. The video data transmitting unit 110 transmits the video data 105 stored in the video data storing unit 104 to the preservation server 200 in response to a predetermined condition being satisfied.

The history data storing unit 116 stores history data 117 containing the line speed measured by the line speed measuring unit 112, and a date and time at which the measurement was executed. The history data transmitting unit 114 transmits the history data 117 stored in the history data storing unit 116 to a preservation destination.

The machine learning unit 118 generates a machine learning model to which a date and time is input and which outputs a line speed, through machine learning by using multiple pieces of history data 117 stored in the history data storing unit 116.

The condition setting unit 120 sets a condition for starting transmission of the video data 105 by using the machine learning model. For example, the condition setting unit 120 uses the machine learning model and estimates a line speed for each date and time, then identifies a time or timeframe in which the estimated line speed is equal to or more than a predetermined threshold value, and sets a condition for starting transmission of the video data 105. The video data transmitting unit 110 may decide a timing for transmitting the video data 105 according to the condition set by the condition setting unit 120.

Figure 7:
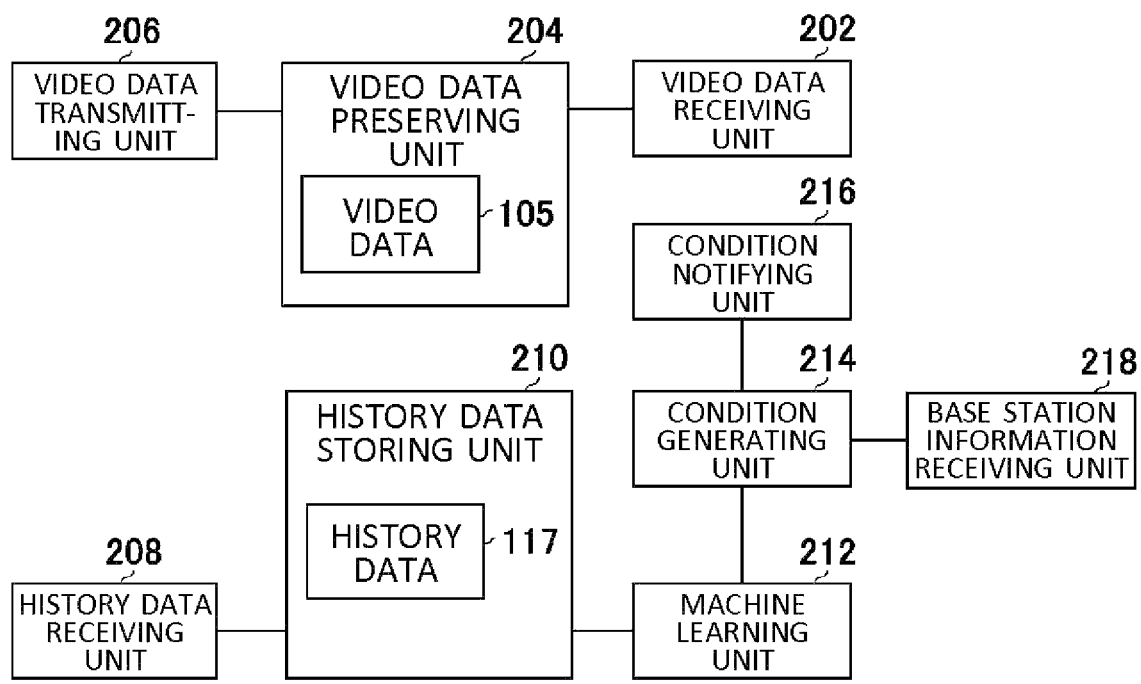
FIG. 7 schematically illustrates one example of functional structure of a preservation server 200.

FIG. 7 schematically illustrates one example of functional structure of the preservation server 200. The preservation server 200 includes a video data receiving unit 202, a video data preserving unit 204, a video data transmitting unit 206, a history data receiving unit 208, a history data storing unit 210, a machine learning unit 212, a condition generating unit 214, a condition notifying unit 216, and a base station information receiving unit 218. Note that, it is not essential for the preservation server 200 to include all of these above.

The video data receiving unit 202 receives the video data 105 transmitted by the video data transmitting unit 110 of the video transmission apparatus 100. The video data preserving unit 204 stores the video data 105 received by the video data receiving unit 202.

The video data transmitting unit 206 transmits the video data 105 stored in the video data preserving unit 204. For example, the video data transmitting unit 206 transmits the video data to the display apparatus 500 in response to a request from the display apparatus 500.

The history data receiving unit 208 receives history data 117 transmitted by the history data transmitting unit 114. The history data storing unit 210 stores the history data 117 received by the history data receiving unit 208.

The machine learning unit 212 generates a machine learning model to which a date and time is input and which outputs a line speed, through machine learning by using multiple pieces of history data 117 stored in the history data storing unit 210.

The condition generating unit 214 generates a condition for the video data transmitting unit 110 to transmit the video data 105 by using the machine learning model generated by the machine learning unit 212. For example, the condition generating unit 214 uses the machine learning model and estimates a line speed for each date and time, then identifies a time or timeframe in which the estimated line speed is equal to or more than a predetermined threshold value, and sets a condition for starting transmission of the video data 105.

The condition notifying unit 216 notifies the video transmission apparatus 100 of the condition generated by the condition generating unit 214. The video data transmitting unit 110 of the video transmission apparatus 100 may transmit the video data 105 according to the received condition.

If the video transmission apparatus 100 is connected to the network 20 via a wireless base station, the base station information receiving unit 218 receives base station information related to this wireless base station, from this wireless base station which has relayed transmission of video data from the video data transmitting unit 110 to the preservation server 200. The base station information may contain information about communication traffic in the wireless base station.

The condition generating unit 214 may generate a condition for the video data transmitting unit 110 to transmit the video data 105 based on the base station information received by the base station information receiving unit 218. For example, the condition generating unit 214 identifies a time or timeframe in which communication traffic at the wireless base station is relatively low or is a predetermined threshold value or less based on the base station information, and generates a condition.

FIG. 8 schematically illustrates one example of a history data table 600. Multiple pieces of history data 117 are registered in the history data table 600. The history data table 600 has history numbers 602, dates and times 604, and line speeds 610. The history data table 600 is stored in the history data storing unit 116 and used as trained data for machine learning in the machine learning unit 118. Also, the history data table 600 is stored in the history data storing unit 210 and used as trained data for machine learning in the machine learning unit 212.

The history numbers 602 are numbers each given per data item of the history data table 600. The history numbers 602 are used like indexes when reading out every data item of the history data table 600.

The dates and times 604 include years, months, and dates 606, and times 608 which show dates and times at which line speed measurement were performed by the line speed measuring unit 112. The times 608 may show times by every hour, indicating that line speed measurement is performed every hour. The line speeds 610 include results of the line speed measurement executed at the dates and times 604. The line speeds 610 is not limited to be measured every hour.

Specifically, data of which a history number 602 in the history data table 600 is four shows 2021/11/11 as a year, month, and date 606, 6:00 as a time 608, and 100 Mbps as an executed line speed 610.

For example, if the time 608 is 3:00 when a machine learning model machine learns with an input being a history data table 600 such as that shown in the diagram, the machine learning unit 118 or the machine learning unit 212 learns that the line speed 610 is 200 Mbps, and the line speed is likely to be higher than other timeframes. If such a tendency continues daily, the machine learning unit 118 may determine 3:00 AM as a transmission time for the video data 105, and output 3:00 AM to the condition setting unit 120. Similarly, the machine learning unit 212 may determine 3:00 AM as a transmission time for the video data 105, and output 3:00 AM to the condition generating unit 214.

Figure 9:
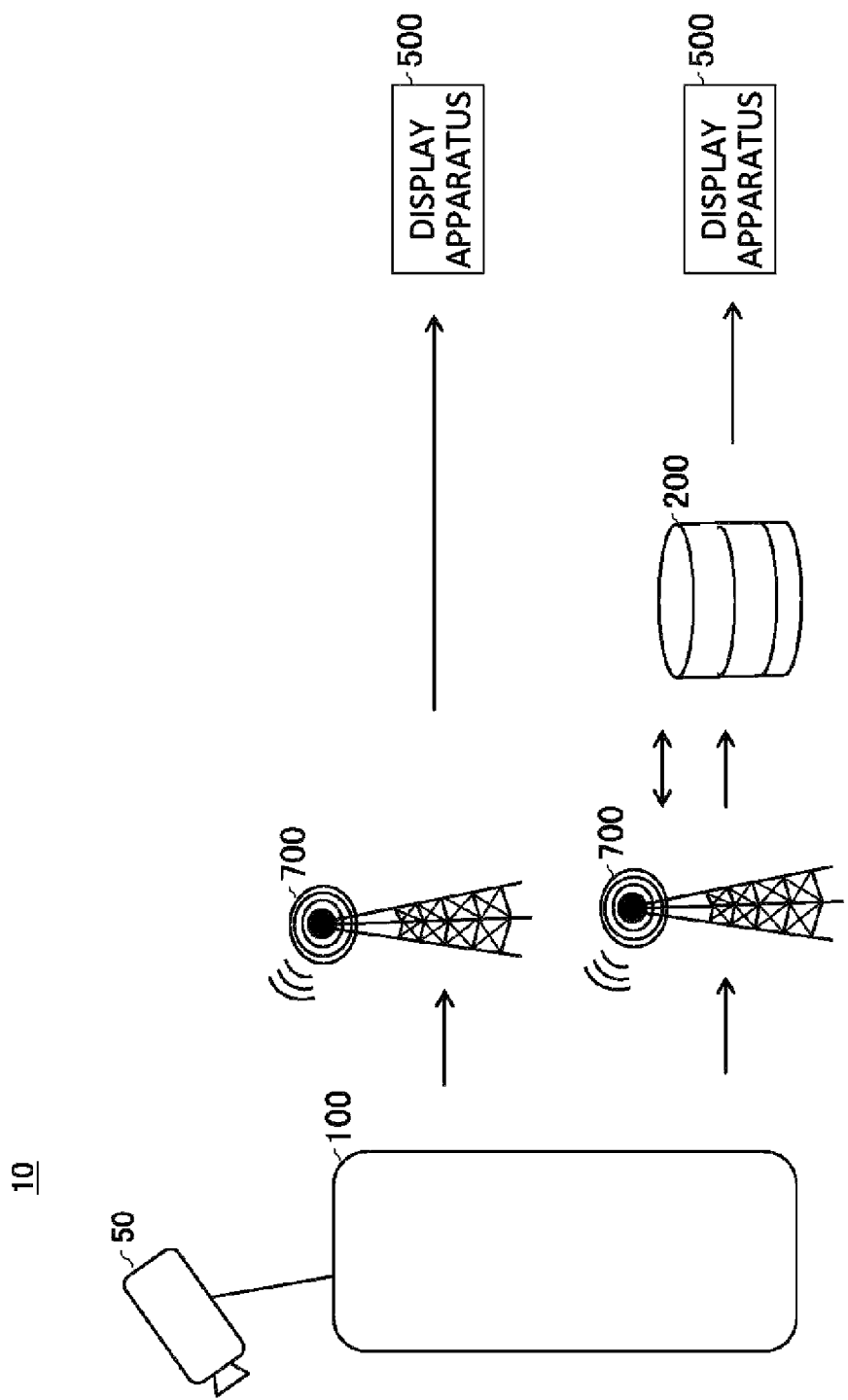
FIG. 9 schematically illustrates one example of the system 10.

FIG. 9 schematically illustrates one example of the system 10. In FIG. 9, the video transmission apparatus 100 is connected to the network 20 via a wireless base station 700. Note that, illustration of the network 20 is omitted in this diagram.

The video transmission apparatus 100 transmits reduced video of which a data volume is reduced by performing image processing on video data 105 captured by the camera 50 to the display apparatus 500 via the wireless base station 700. Also, the video transmission apparatus 100 temporarily stores the video data 105, and transmits the video data 105 to the preservation server 200 via the wireless base station 700 at a timing under a condition such as a preset time etc. The preservation server 200 stores the received video data 105. For example, the preservation server 200 transmits the video data 105 to the display apparatus 500 in response to a request from the display apparatus 500.

Network congestion is more likely to occur in a path between the video transmission apparatus 100 and the wireless base station 700, compared to paths between the wireless base station 700 and the preservation server 200, and the wireless base station 700 and the display apparatus 500. Therefore, with the structure in which the video transmission apparatus 100 transmits the video data 105 to the preservation server 200 via the wireless base station 700 in response to a predetermined condition being satisfied, a possibility in a mobile communication line to be congested can be reduced. In this manner, a possibility of impacting on an existing mobile communication user can be reduced.

Figure 10:
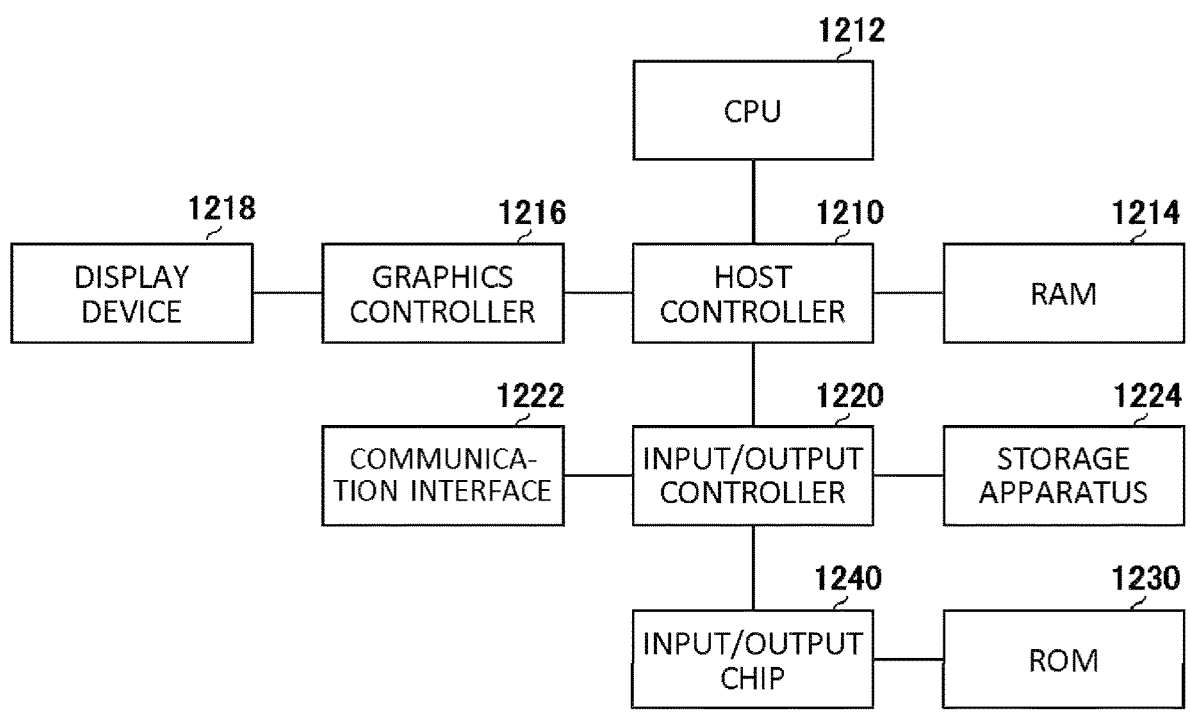
FIG. 10 schematically illustrates one example of a hardware configuration of a computer 1200 which functions as the video transmission apparatus 100, the preservation server 200, or a display apparatus 500.

FIG. 10 schematically illustrates one example of a hardware configuration of a computer 1200 which functions as the video transmission apparatus 100, the preservation server 200, or a display apparatus 500. The computer 1200 according to the present embodiment includes a CPU 1212, a RAM 1214, and a graphics controller 1216, which are interconnected by a host controller 1210. The computer 1200 also includes input/output units such as a communication interface 1222, a storage apparatus 1224, a DVD drive and an IC card drive, which are connected to the host controller 1210 via an input/output controller 1220. The DVD drive may be a DVD-ROM drive, a DVD-RAM drive, and the like. The storage apparatus 1224 may be a hard disk drive, a solid-state drive, and the like. The computer 1200 also includes a ROM 1230 and a legacy input/output unit such as a keyboard, which are connected to the input/output controller 1220 via an input/output chip 1240.

The CPU 1212 operates according to programs stored in the ROM 1230 and the RAM 1214, and thereby controls each unit. The graphics controller 1216 obtains image data which is generated by the CPU 1212 in a frame buffer or the like provided in the RAM 1214 or in itself so as to cause the image data to be displayed on a display device 1218.

The communication interface 1222 communicates with other electronic devices via a network. The storage apparatus 1224 stores programs and data used by the CPU 1212 in the computer 1200. The DVD drive reads the programs or the data from the DVD-ROM or the like, and provides the storage apparatus 1224 with the programs or the data. The IC card drive reads programs and data from an IC card and/or writes programs and data into the IC card.

The ROM 1230 stores, in itself, a boot program or the like that is executed by the computer 1200 during activation, and/or a program that depends on hardware of the computer 1200. The input/output chip 1240 may also connect various input/output units via a USB port, a parallel port, a serial port, a keyboard port, a mouse port, or the like to the input/output controller 1220.

A program is provided by a computer-readable storage medium such as the DVD-ROM or the IC card. The program is read from the computer-readable storage medium, installed into the storage apparatus 1224, RAM 1214, or ROM 1230, which are also examples of a computer-readable storage medium, and executed by the CPU 1212. Information processing written in these programs is read by the computer 1200, and provides cooperation between the programs and the various types of hardware resources described above. An apparatus or method may be constituted by performing the operation or processing of information in accordance with the usage of the computer 1200.

For example, in a case where a communication is executed between the computer 1200 and an external device, the CPU 1212 may execute a communication program loaded in the RAM 1214 and instruct the communication interface 1222 to perform communication processing based on processing written in the communication program. Under the control of the CPU 1212, the communication interface 1222 reads transmission data stored in a transmission buffer region provided in a recording medium such as the RAM 1214, the storage apparatus 1224, the DVD-ROM, or the IC card, transmits the read transmission data to the network, or writes received data which is received from the network to a receiving buffer region or the like provided on the recording medium.

Further, the CPU 1212 may execute various types of processing on the data on the RAM 1214 such that the RAM 1214 reads all or necessary parts of a file or database stored in an external recording medium such as the storage apparatus 1224, a DVD drive (DVD-ROM) and the IC card. Then, the CPU 1212 may write the processed data back in the external recording medium.

Various types of information such as various types of programs, data, tables, and databases may be stored in recording media and subjected to the information processing. The CPU 1212 may execute, on the data read from the RAM 1214, various types of processing including various types of operations, information processing, conditional judgement, conditional branching, unconditional branching, information retrieval/replacement, or the like described throughout the present disclosure and specified by instruction sequences of the programs, to write the results back to the RAM 1214. In addition, the CPU 1212 may retrieve information in a file, a database, or the like in the recording medium. For example, when multiple entries each having an attribute value of a first attribute associated with an attribute value of a second attribute are stored in the recording medium, the CPU 1212 may retrieve, from the multiple entries, for an entry that matches a condition in which the attribute value of the first attribute is specified, and read the attribute value of the second attribute stored in the entry, thereby obtaining the attribute value of the second attribute associated with the first attribute that satisfies a predetermined condition.

The programs or software module described above may be stored on the computer 1200 or in a computer-readable storage medium near the computer 1200. In addition, a recording medium such as a hard disk or a RAM provided in a server system connected to a dedicated communication network or the Internet can be used as the computer-readable storage medium, thereby providing the program to the computer 1200 via the network.

Blocks in flowcharts and block diagrams in the present embodiments may represent stages of processes in which operations are executed or "units" of an apparatus responsible for executing operations. A specific stage and "unit" may be implemented by a dedicated circuit, a programmable circuit supplied along with a computer-readable instruction stored on a computer-readable storage medium, and/or a processor supplied along with the computer-readable instruction stored on the computer-readable storage medium. The dedicated circuit may include a digital and/or analog hardware circuit, or may include an integrated circuit (IC) and/or a discrete circuit. The programmable circuit may include, for example, a reconfigurable hardware circuit including logical AND, logical OR, logical XOR, logical NAND, logical NOR, and other logical operations, and a flip-flop, a register, and a memory element, such as a field-programmable gate array (FPGA) and a programmable logic array (PLA).

The computer-readable storage medium may include any tangible device capable of storing an instruction executed by an appropriate device, so that the computer-readable storage medium having the instruction stored thereon constitutes a product including an instruction that may be executed in order to provide means to execute an operation specified by a flowchart or a block diagram. Examples of the computer-readable storage medium may include an electronic storage medium, a magnetic storage medium, an optical storage medium, an electromagnetic storage medium, a semiconductor storage medium, and the like. More specific examples of computer-readable storage medium may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

The computer-readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object-oriented programming language such as Smalltalk (registered trademark), JAVA (registered trademark), and C++, and a conventional procedural programming language such as a "C" programming language or a similar programming language.

The computer-readable instruction may be provided to a general-purpose computer, a special purpose computer, or a processor or programmable circuit of another programmable data processing apparatus locally or via a local area network (LAN), a wide area network (WAN) such as the Internet or the like in order that the general-purpose computer, the special purpose computer, or the processor or the programmable circuit of the other programmable data processing apparatus executes the computer-readable instruction to provide means for executing operations specified by the flowchart or the block diagram. An example of the processor includes a computer processor, processing unit, microprocessor, digital signal processor, controller, microcontroller, or the like.

While the present invention has been described by way of the embodiments, the technical scope of the present invention is not limited to the scope described in the above-described embodiments. It is apparent to persons skilled in the art that various alterations or improvements can be added to the above-described embodiments. It is also apparent from the scope of the claims that the embodiments added with such alterations or improvements can be included in the technical scope of the present invention.

Each process in the operations, procedures, steps, stages, and the like performed by an apparatus, system, program, and method shown in the claims, specification, or diagrams can be performed in any order as long as the order is not indicated by "prior to," "before," or the like and as long as the output from a previous process is not used in a later process. Even if the operational flow is described using phrases such as "first" or "next" in the claims, specification, or diagrams, it does not necessarily mean that the process must be performed in this order.

EXPLANATION OF REFERENCES

10: system; 20: network; 50: camera; 100: video transmission apparatus; 102: video data obtaining unit; 104: video data storing unit; 105: video data; 106: reduced video generating unit; 108: streaming transmitting unit; 110: video data transmitting unit; 112: line speed measuring unit; 114: history data transmitting unit; 116: history data storing unit; 117: history data; 118: machine learning unit; 120: condition setting unit; 200: preservation server; 202: video data receiving unit; 204: video data preserving unit; 206: video data transmitting unit; 208: history data receiving unit; 210: history data storing unit; 212: machine learning unit; 214: condition generating unit; 216: condition notifying unit; 218: base station information receiving unit; 500: display apparatus; 600: history data table; 602: history numbers; 604: dates and times; 606: years, months, and dates; 608: times; 610: line speeds; 700: wireless base station; 1212: CPU; 1214: RAM; 1216: graphics controller; 1218: display device; 1220: input/output controller; 1222: communication interface; 1224: storage apparatus; 1230: ROM; 1240: input/output chip.

What is claimed is:
1. A video transmission apparatus, comprising:
a video data obtaining unit which obtains video data;
a video data storing unit which stores the video data obtained by the video data obtaining unit;
a reduced video generating unit which generates reduced video of which a data volume is reduced by performing image processing on the video data obtained by the video data obtaining unit;
a streaming transmitting unit which transmits the reduced video to a transmission destination by streaming;

a video data transmitting unit which transmits the video data stored in the video data storing unit to a preservation destination of the video data in response to a predetermined condition being satisfied;

a history data storing unit which stores history data containing a measured line speed and a date and time at which the measured line speed was executed;

a machine learning unit which generates a machine learning model to which a date and time is input and which outputs a line speed, through machine learning by using multiple pieces of the history data stored in the history data storing unit; and a condition setting unit which sets the predetermined condition by using the machine learning model.

2. The video transmission apparatus according to claim 1, wherein
the video data obtaining unit receives the video data captured by a camera, from the camera.

3. The video transmission apparatus according to claim 2, wherein
the video data transmitting unit transmits the video data which is stored in the video data storing unit and compressed, to the transmission destination.

4. The video transmission apparatus according to claim 1, wherein
the video data transmitting unit transmits the video data which is stored in the video data storing unit and compressed, to the transmission destination.

5. The video transmission apparatus according to claim 1, wherein
the reduced video generating unit executes at least any of image quality reduction on the video data, frame rate reduction on the video data, or trimming on the video data in order to reduce a data volume of the video data and thereby generate the reduced video.

6. The video transmission apparatus according to claim 1, wherein
the video data transmitting unit starts transmission of the video data to the preservation destination at a preset time.

7. The video transmission apparatus according to claim 1, wherein
the video data transmitting unit transmits the video data to the preservation destination in a preset timeframe.

8. The video transmission apparatus according to claim 7, wherein
if the video data transmitting unit determines that transmission of the video data will not be completed within the preset timeframe, the video data transmitting unit transmits a part of the video data extracted from the video data according to a predetermined condition, in the preset timeframe.

9. The video transmission apparatus according to claim 7, wherein
if multiple pieces of the video data are stored in the video data storing unit, and the video data transmitting unit determines that transmission of the multiple pieces of the video data will not be completed within the preset timeframe, the video data transmitting unit transmits at least any of the multiple pieces of the video data according to priorities of the multiple pieces of the video data.

10. The video transmission apparatus according to claim 9, wherein
the video data transmitting unit preferentially transmits a piece of video data, among the multiple pieces of the video data, obtained by the video data obtaining unit at an obtainment time earlier than those of a rest of the multiple pieces of the video data.

11. The video transmission apparatus according to claim 1, further comprising
a line speed measuring unit which measures a line speed of a communication line to the preservation destination, wherein
if the line speed measured by the line speed measuring unit is equal to or more than a predetermined transmission threshold value, the video data transmitting unit transmits the video data to the preservation destination.

12. The video transmission apparatus according to claim 11, wherein:
the line speed measuring unit measures a line speed of a communication line to the transmission destination; and
if the line speed of the communication line to the transmission destination measured by the line speed measuring unit is equal to or more than a predetermined transmission threshold value at a timing for the streaming transmitting unit to transmit the reduced video to the transmission destination, the video data transmitting unit transmits the video data to the transmission destination instead of the streaming transmitting unit transmitting to the transmission destination by streaming.

13. The video transmission apparatus according to claim 1, further comprising:
a line speed measuring unit which measures a line speed of a communication line to the preservation destination.

14. The video transmission apparatus according to claim 1, wherein:
the streaming transmitting unit transmits the reduced video to a display apparatus by streaming through a mobile communication line; and
the video data transmitting unit transmits the video data to the preservation destination located in a cloud through the mobile communication line.

15. A non-transitory computer-readable storage medium having stored thereon a program that causes a computer to function as:
a video data obtaining unit which obtains video data;
a video data storing unit which stores the video data obtained by the video data obtaining unit;
a reduced video generating unit which generates reduced video of which a data volume is reduced by performing image processing on the video data obtained by the video data obtaining unit;
a streaming transmitting unit which transmits the reduced video to a transmission destination by streaming;
a video data transmitting unit which transmits the video data stored in the video data storing unit to a preservation destination of the video data in response to a predetermined condition being satisfied;
a history data storing unit which stores history data containing a measured line speed and a date and time at which the measured line speed was executed;
a machine learning unit which generates a machine learning model to which a date and time is input and which outputs a line speed, through machine learning by using multiple pieces of the history data stored in the history data storing unit; and
a condition setting unit which sets the predetermined condition by using the machine learning model.

16. A video transmission method executed by a computer, comprising:
obtaining video data;

storing video data by storing the video data obtained in the obtaining video data, in a video data storing unit;

generating reduced video of which a data volume is reduced by performing image processing on the video data obtained in the obtaining video data;

transmitting by streaming, by transmitting the reduced video to a transmission destination by streaming;

transmitting video data by transmitting the video data stored in the video data storing unit to a preservation destination of the video data in response to a predetermined condition being satisfied;

storing history data containing a measured line speed and a date and time at which the measured line speed was executed;

generating a machine learning model to which a date and time is input and which outputs a line speed, through machine learning by using multiple pieces of the history data stored in the history data storing unit; and setting the predetermined condition by using the stored history data machine learning model.

17. A system, comprising:

a video transmission apparatus; and a preservation server, wherein the video transmission apparatus has a video data obtaining unit which obtains video data, a video data storing unit which stores the video data obtained by the video data obtaining unit, a reduced video generating unit which generates reduced video of which a data volume is reduced by performing image processing on the video data obtained by the video data obtaining unit, a streaming transmitting unit which transmits the reduced video by streaming, a video data transmitting unit which transmits the video data stored in the video data storing unit to the preservation server in response to a predetermined condition being satisfied, a history data storing unit which stores history data containing a measured line speed and a date and time at which the measured line speed was executed, a machine learning unit which generates a machine learning model to which a date and time is input and which outputs a line speed, through machine learning by using multiple pieces of the history data stored in the history data storing unit; and a condition setting unit which sets the predetermined condition by using the machine learning model, the preservation server has a video data preserving unit which stores the video data received from the video transmission apparatus.

18. The system according to claim 17, wherein:

the video transmission apparatus further has a line speed measuring unit which measures the line speed of a communication line to the preservation server, a history data transmitting unit which transmits the history data to the preservation server; and the preservation server further has a condition notifying unit which notifies the video transmission apparatus of the predetermined condition set by the condition setting unit.

19. The system according to claim 17, wherein:

the streaming transmitting unit transmits the reduced video to a display apparatus for viewing video, by streaming through a mobile communication line; and the video data transmitting unit transmits the video data to the preservation server located in a cloud through the mobile communication line.

20. The system according to claim 19, wherein the preservation server further has:

a base station information receiving unit which receives base station information related to a wireless base station, from the wireless base station which has relayed transmission of the video data from the video data transmitting unit to the preservation server;

a condition generating unit which generates the predetermined condition based on the base station information received by the base station information receiving unit; and a condition notifying unit which notifies the video transmission apparatus of the predetermined condition generated by the condition generating unit.

* * * * *